US011061741B2

(12) United States Patent
Nelson et al.

(10) Patent No.: US 11,061,741 B2
(45) Date of Patent: Jul. 13, 2021

(54) TECHNIQUES FOR EFFICIENTLY PERFORMING DATA REDUCTIONS IN PARALLEL PROCESSING UNITS

(71) Applicant: NVIDIA CORPORATION, Santa Clara, CA (US)

(72) Inventors: Peter Nelson, San Francisco, CA (US); Olivier Giroux, San Jose, CA (US); Ajay Sudarshan Tirumala, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 133 days.

(21) Appl. No.: 16/513,393

(22) Filed: Jul. 16, 2019

(65) Prior Publication Data
US 2021/0019198 A1 Jan. 21, 2021

(51) Int. Cl.
*G06F 9/46* (2006.01)
*G06F 9/52* (2006.01)

(52) U.S. Cl.
CPC ................................ *G06F 9/52* (2013.01)

(58) Field of Classification Search
CPC ....................................................... G06F 9/52
See application file for complete search history.

*Primary Examiner* — Gregory A Kessler
(74) *Attorney, Agent, or Firm* — Artegis Law Group, LLP

(57) ABSTRACT

Techniques are disclosed for reducing the latency associated with performing data reductions in a multithreaded processor. In response to a single instruction associated with a set of threads executing in the multithreaded processor, a warp reduction unit acquires register values stored in source registers, where each register value is associated with a different thread included in the set of threads. The warp reduction unit performs operation(s) on the register values to compute an aggregate value. The warp reduction unit stores the aggregate value in a destination register that is accessible to at least one of the threads in the set of threads. Because the data reduction is performed via a single instruction using hardware specialized for data reductions, the number of cycles required to perform the data reduction is decreased relative to prior-art techniques that are performed via multiple instructions using hardware that is not specialized for data reductions.

17 Claims, 8 Drawing Sheets

TECHNIQUES FOR EFFICIENTLY PERFORMING DATA REDUCTIONS IN PARALLEL PROCESSING UNITS

BACKGROUND

Field of the Various Embodiments

Embodiments of the present disclosure relate generally to parallel processing systems and, more specifically, to techniques for efficiently performing data reductions in parallel processing units.

Description of the Related Art

Parallel processing units ("PPUs") are capable of very high performance using a large number of small, parallel execution threads on dedicated programmable hardware processing units. In PPUs, a "warp" refers to a group of threads for which each active thread concurrently executes the same instruction on different input data. In many parallel processing algorithms, the threads in one or more warps are configured to concurrently generate per-thread results and then perform a "data reduction" across the per-thread results to generate a single aggregate result. For example, each of 162,944 threads could compute a different per-thread result based on a different portion of an image. Subsequently, the threads could apply an addition operation across the per-thread results to generate an aggregate result.

In one approach to performing data reductions, each thread performs an atomic operation (i.e., an operation that is performed without interference from other threads) to aggregate the associated per-thread result to a common memory location that is accessible to all the threads. Note that each thread initially stores the associated per-thread result in a register that has a relatively fast access time but is not directly accessible to other threads. By contrast, the common memory location is typically in a memory having a relatively slow access time, such as a shared memory or a global memory. One drawback of this approach is that the time required to perform the atomic operations to the common memory location can substantially reduce the overall performance of the associated parallel processing algorithm. For example, for each of 162,944 threads to perform an atomic addition of "1" to a single location in global memory requires 162,944 cycles.

To reduce the time required to perform the atomic addition operations, some PPUs are capable of performing at least a portion of the atomic addition operations "inline" between the hardware processing units and a global memory. However, the inline functionality does not reduce the time required to perform data reductions using other reduction operations (e.g., arithmetic minimum, etc.) and/or storing the aggregate result in another memory, such as a shared memory or a shared register.

Other PPUs perform initial data reductions across the per-thread results for each warp using shuffle instructions. A shuffle instruction enables each thread included in a warp to access the ostensibly private register of a different thread in the warp based on a configurable pattern. To perform the initial data reduction for a warp of N threads, a first shuffle instruction enables each of N/2 threads to apply a reduction operation to a different pair of per-thread results to generate a two-way result. A second shuffle instruction enables each of N/4 threads to apply the reduction operation to a different pair of two-way results to generate a four-way result. After the final shuffle instruction, the first thread is associated with a per-warp result while the other threads are associated with meaningless results. The first thread from each warp then performs an atomic version of the reduction operation to aggregate the associated per-warp result to a common memory location.

Performing the initial data reduction using shuffle operations reduces the total number of atomic operations to the common memory by a factor of N. For example, if each warp includes 32 threads, then for a data reduction of 162,944 per-thread results, the total number of memory operations is reduced from 162,944 to 5,092. As a result, the time required to perform the overall data reduction is reduced relative to some other approaches to performing data reduction operations. However, computing each per-warp result typically involves executing at least fifteen instructions, storing intermediate results in temporary registers, computing wasted results, and hundreds of cycles. These inefficiencies can substantially reduce the overall performance of an associated parallel processing algorithm despite the reduced number of memory operations.

As the foregoing illustrates, what is needed in the art are more effective techniques for applying a reduction operation across values associated with different threads included in a warp.

SUMMARY

One embodiment of the present disclosure sets forth a computer-implemented method for applying a reduction operation across values associated with different threads included in a warp. The method includes, in response to a single instruction associated with a plurality of threads executing in a multithreaded processor, accessing a plurality of register values stored in a plurality of source registers, where each source register in the plurality of source registers is associated with a different thread included in the plurality of threads; executing one or more operations on the plurality of register values to generate an aggregate value; and storing the aggregate value in a first destination register that is accessible to at least one thread included in the plurality of threads.

At least one technical advantage of the disclosed techniques relative to the prior art is that, with the disclosed techniques, the time required to perform data reductions can be reduced. Performing each warp-level data reduction in response to a single instruction without using temporary registers and without computing superfluous output values can reduce the latency by an order of magnitude compared to prior-art shuffle-based techniques. Additionally, the warp reduction unit can perform data reductions involving a variety of different reduction operations, data types, and data sizes. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
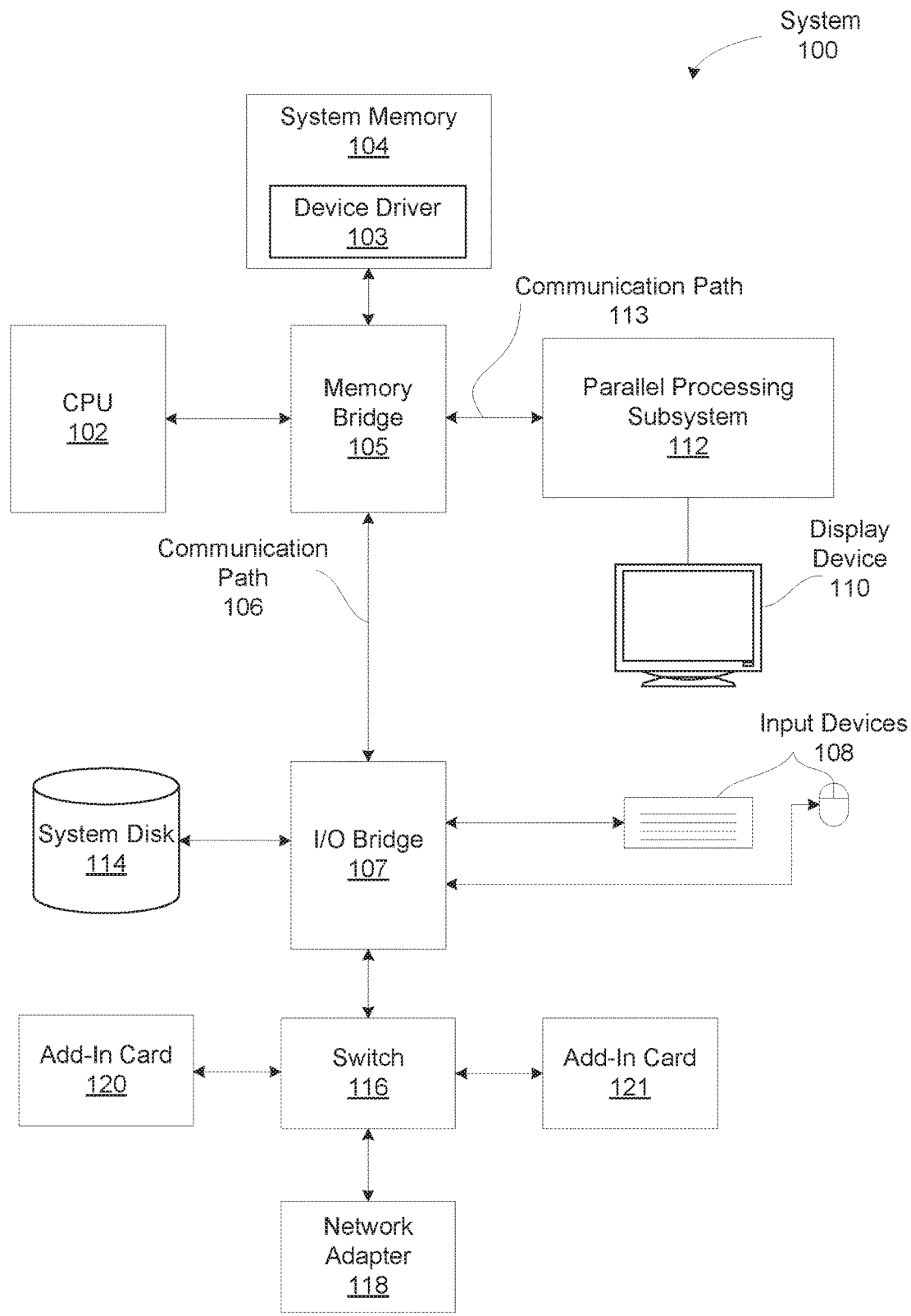
FIG. 1 is a block diagram illustrating a system configured to implement one or more aspects of the present disclosure.

FIG. 1 is a block diagram illustrating a system 100 configured to implement one or more aspects of the present disclosure. As shown, system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on a chip ("SoC").

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
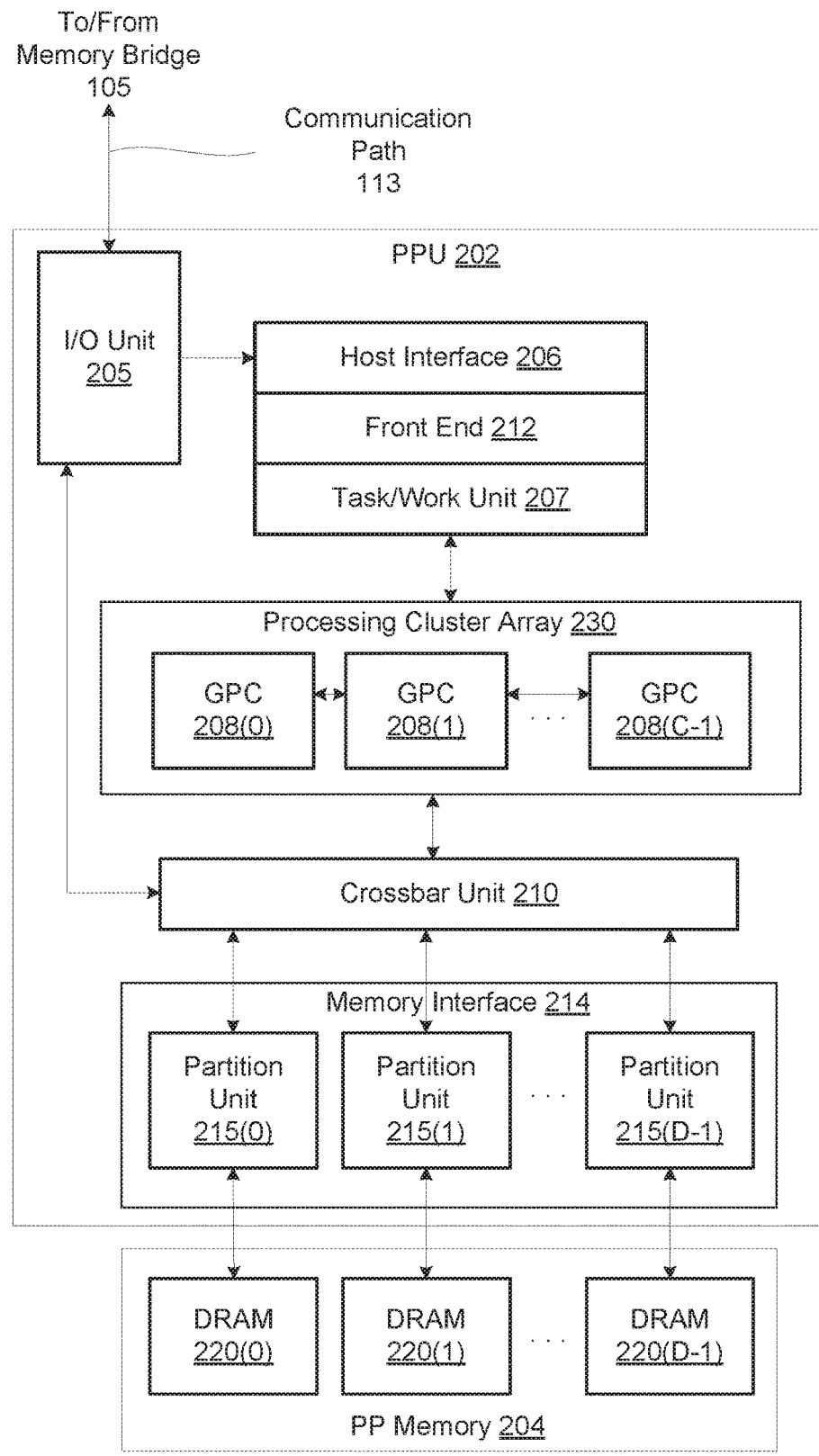
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing ("PP") memory 204. PPU 202 and PP memory 204 may be implemented using one or more integrated circuit devices, such as programmable processors, application specific integrated circuits ("ASICs"), or memory devices, or in any other technically feasible fashion.

In some embodiments, PPU 202 comprises a graphics processing unit ("GPU") that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of system 100 may be varied. In some embodiments, parallel processing subsystem 112, which includes at least one PPU 202, is implemented as an add-in card that can be inserted into an expansion slot of system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on a chip (SoC).

In operation, front end 212 transmits processing tasks received from host interface 206 to a work distribution unit (not shown) within task/work unit 207. The work distribution unit receives pointers to processing tasks that are encoded as task metadata ("TMD") and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that general processing clusters ("GPCs") 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C GPCs 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D partition units 215, where D 1. Each partition unit 215 is coupled to one or more dynamic random access memories ("DRAMs") 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205 in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs 202 may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
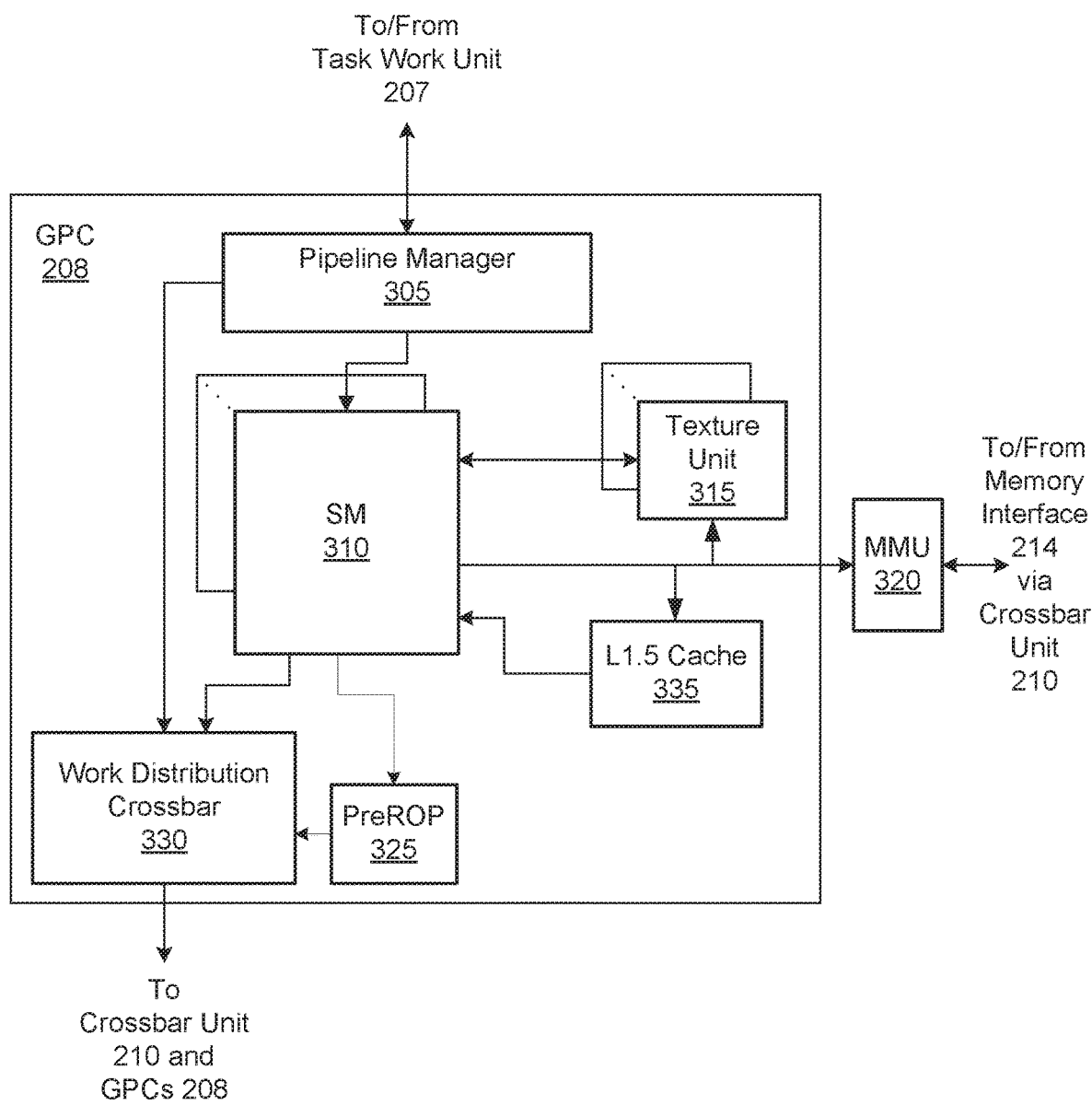
FIG. 3 is a block diagram of a general processing cluster included in the parallel processing unit of FIG. 2, according to various embodiments.

FIG. 3 is a block diagram of a GPC 208 included in PPU 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data ("SIMD") instruction issue techniques are used to support parallel execution of a large number of threads without providing multiple independent instruction units. In other embodiments, single-instruction, multiple-thread ("SIMT") techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors ("SMs") 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional units (not shown), such as execution units and load-store units. Processing operations specific to any of the functional units may be pipelined, which enables a new instruction to be issued for execution before a previous instruction has completed execution. Any combination of functional units within a given SM 310 may be provided. In various embodiments, the functional units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution units may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one ("L1") cache or uses space in a corresponding L1 cache outside of the SM 310 to support, among other things, load and store operations performed by the execution units. Each SM 310 also has access to level two ("L2") caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five ("L1.5") cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit ("MMU") 320 that is configured to map virtual addresses into physical addresses. In various embodiments, MMU 320 may reside either within GPC 208 or within the memory interface 214. The MMU 320 includes a set of page table entries ("PTEs") used to map a virtual address to a physical address of a tile or memory page and optionally a cache line index. The MMU 320 may include address translation lookaside buffers ("TLB") or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations ("preROP") unit 325 is configured to receive data from SM 310, direct data to one or more raster operations ("ROP") units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present disclosure.

Figure 4:
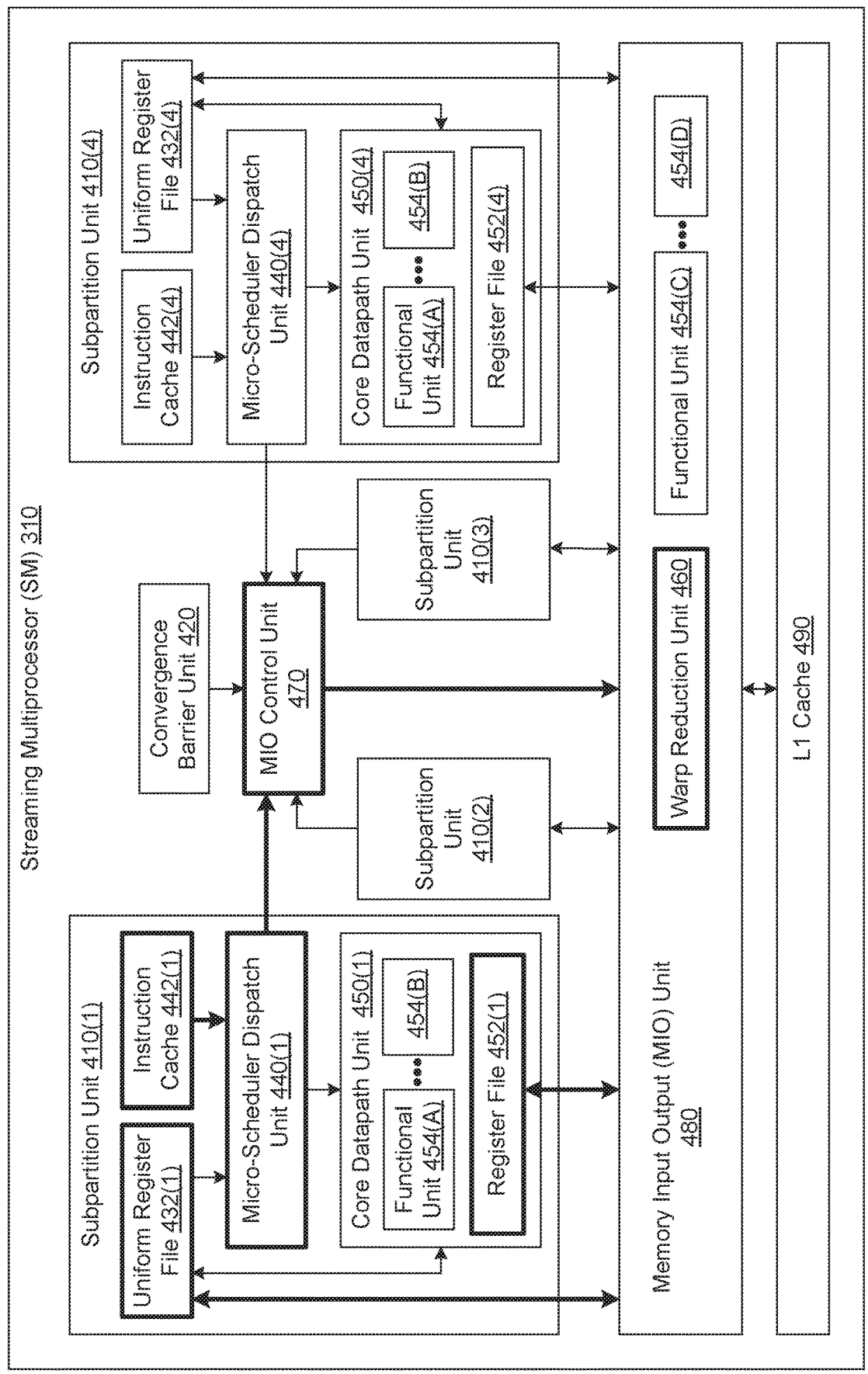
FIG. 4 is a block diagram of a streaming multiprocessor included in the general processing cluster of FIG. 3, according to various embodiments.

FIG. 4 is a block diagram of a streaming multiprocessor (SM) 310 included in the general processing cluster (GPC) 208 of FIG. 3, according to various embodiments. As shown, the SM 310 includes, without limitation, subpartition units 410(1)-410(4), a memory input/output ("MIO") control unit 470, a MIO unit 480, a level one (L1) cache 490, and a convergence barrier unit ("CBU") 420. In alternate embodiments, the SM 310 may include any number of subpartition units 410. For explanatory purposes, multiple instances of like objects are denoted with reference numbers identifying the object and parenthetical numbers identifying the instance where needed.

The warps assigned to the SM 310 are distributed between the subpartitions 410. Each of the subpartition units 410 may be assigned any number of warps, however, a given warp is assigned to only one subpartition unit 410. As shown, each of the subpartition units 410 includes, without limitation, an instruction cache 442, a micro-scheduler dispatch unit 440, a core datapath unit 450, and a uniform register file 432. The parenthetical number "x" for each of the uniform register file 432(x), the instruction cache 442(x), the micro-scheduler dispatch unit 440(x), and the core datapath unit 450(x) indicates the associated subpartition unit 410(x).

As described in conjunction with FIG. 3, the SM 310 receives processing tasks from the pipeline manager 305. For each warp, the assigned subpartition unit 410(x) receives the assigned processing tasks and stores the associated instructions in the instruction cache 442(x). The micro-scheduler dispatch unit 440(x) reads instructions from the instruction cache 442(x). If a given instruction targets a functional unit 454 that is included in the core datapath unit 450(x), then the micro-scheduler dispatch unit 440(x) issues the instruction to the functional unit 454(x). Otherwise, the micro-scheduler dispatch unit 440(x) forwards the instruction to the MIO control unit 470.

The core datapath unit 450(x) includes, without limitation, any number of functional units 454 and a register file 452(x). Each of the functional units 454 included in the core datapath unit 450(x) may perform any number and type of operations to execute threads of warps assigned to the subpartition unit 410(x). Each of the functional units 454 included in the core datapath unit 450(x) has a fixed latency, such as an arithmetic logic unit ("ALU"). Each of the functional units 454 included in the core datapath unit 450(x) is connected via any number of buses to the register file 452(x) and the uniform register file 432(x).

The register file 452(x) is cache memory that includes, without limitation, any number of registers and any number of read and/or write ports. Each register in the register file 452(x) is assigned to one of the threads of one of the warps assigned to the subpartition unit 410(x) and is not directly accessible to any of the other threads. In this fashion, each thread of each warp assigned to the subpartition unit 410(x) has the exclusive use of a set of registers in the register file 452(x). As described in greater detail in conjunction with FIG. 6, any number of the registers may be organized as a vector register that stores N M-bit values. For instance, in some embodiments, a vector register may store a different 32-bit value for each thread in a 32-thread warp. The register file 452(x) may be implemented in any technically feasible fashion. In alternate embodiments, the registers included in the register filer 452(x) may be arranged and assigned to threads and/or warps in any technically feasible fashion.

The uniform register file 432(x) is a cache memory that includes, without limitation, any number of uniform registers and any number of read and/or write ports. Each uniform register in the uniform register file 432(x) is accessible to all of the threads included in a warp. The uniform register file 432(x) may be implemented in any technically feasible fashion. In alternate embodiments, the uniform registers included in the register filer 452(x) may be arranged and assigned to threads and/or warps in any technically feasible fashion.

The CBU 420 manages diverged threads, performs synchronization operations, and ensures forward progress for all non-exited threads included in a warp. When only a portion of the threads in a warp participate in an instruction, the threads in the warp are referred to herein as "diverged" during the execution of the instruction. The CBU 420 may be configured to perform any amount and type of synchronization operations based on any number and type of synchronization instructions.

For instance, the CBU 420 may be configured to converge a set of threads that are included in a warp via a "WARPSYNC" instruction. The CBU 420 blocks different threads included in the set of threads at the "WARPSYNC" instruction until all of the threads included in the set of threads are executing the WARPSYNC instruction together. At the exit of the WARPSYNC instruction, the set of threads are converged and the CBU 420 configures the set of threads to execute the instruction immediately following the WARPSYNC instruction.

The MIO unit 480 includes, without limitation, any number of the functional units 454. The functional units 454 included in the MIO unit 480 perform any number and type of operations to execute threads assigned to the SM 310 irrespective of the assigned subpartition unit 410. Each of the functional units 454 included in the MIO unit 480 has a variable latency, such as a load/store unit, and/or is provisioned for a low throughput relative to the functional units 454 in the core datapath units 450(1)-450(4). Note that if a given functional unit 454 is included in the core datapath units 450(1)-450(4), then four different instances of the functional unit 454 can execute at any given time on four warps assigned to the four subpartition units 410(1)-410(4). By contrast, if a given functional unit 454 is included in the MIO unit 480, one instance of the functional unit 454 can execute at any given time on one warp assigned to the SM 310. Each of the functional units 454 included in the MIO unit 480 is connected via any number of buses to the register files 452(1)-452(4) and the uniform register files 432(1)-432(4).

As shown, the MIO unit 480 interfaces with the register files 452(1)-452(4), the uniform register files 432(1)-432(4), and the L1 cache 490. The L1 cache 490 may include any type and amount of on-chip memory arranged in any technically feasible fashion. The MIO unit 480 and any number of buses enable each of the functional units 454 included in the SM 310 to access memory locations included in the L1 cache 490.

One limitation of conventional PPUs is that the overall performance of parallel processing algorithms that involve performing data reductions across per-thread results to generate aggregate values can be significantly degraded by inefficiencies associated with sharing data between threads. As described previously herein, performing atomic operations that aggregate the per-thread results to a common memory location accessible to all the threads typically requires at least one cycle per thread. An inline atomic add operation available in some conventional PPUs reduces the time required to perform data reductions that involve an add operation and global memory, but does not reduce the time required to perform other types of data reductions. Some conventional PPUs support shuffle instructions that allow threads within the same warp to exchange data. Using shuffle instructions to generate per-warp results and then aggregating the per-warp results to a common memory location reduces the total number of atomic operations to the common memory location by a factor of N, where N is the number of threads in a warp. However, computing each per-warp result typically involves executing at least fifteen instructions, storing intermediate results in multiple temporary registers, computing meaningless output values, and hundreds of cycles.

Warp Reduction Unit

To enable more efficient data reductions, one of the functional units 454 included in the MIO unit 480 is a warp reduction unit 460. A reduction (REDUX) instruction configures the warp reduction unit 460 to apply a reduction operation across the "source" values (in a source vector register) associated with a set of threads in a warp and store the resulting aggregate value in a destination uniform register. As described in greater detail in conjunction with FIG. 6, the REDUX instruction specifies a reduction operation, a data type/size, a destination uniform register, and a source vector register. Further, the REDUX instruction is associated with a "guard predicate" that, together with an MACTIVE register (not shown in FIG. 4) defines the set of threads in the warp that participate in the REDUX instruction (i.e., participate in the data reduction). The set of threads in the warp that participate in the REDUX instruction are also referred to herein as a "set of participating threads."

The SM 310 and/or a compiler may ensure that the set of participating threads is converged when executing the REDUX instruction in any technically feasible fashion. For instance, in some embodiments, a compiler replaces a portion of software application code that performs a data reduction across a set of threads in a warp with a WARPSYNC instruction followed by a REDUX instruction. The WARPSYNC instruction ensures that the set of participating threads is converged when executing the REDUX instruction.

For explanatory purposes only, units included in the SM 310 that are involved in an exemplary REDUX instruction for a warp assigned to the subpartition 410(1) are depicted in bold. The subpartition unit 410(1) stores the REDUX instruction in the instruction cache 442(1). Subsequently, the micro-scheduler dispatch unit 440(1) reads the REDUX instruction from the instruction cache 442(1) and attaches the associated guard predicate to generate a predicated REDUX instruction (not shown in FIG. 4). Because the warp reduction unit 460 is not included in the core datapath unit 450(1), the micro-scheduler dispatch unit 440(1) forwards the predicated REDUX instruction to the MIO control unit 470. The MIO control unit 470 schedules and issues the predicated REDUX instruction to the warp reduction unit 460.

When the warp reduction unit 460 receives the predicated REDUX instruction, the warp reduction unit 460 acquires a source value list. The source value list includes the values stored in the source vector register that are associated with the set of participating threads. The warp reduction unit 460 may acquire the source value list in any technically feasible fashion. For instance, in some embodiments, the warp reduction unit 460 may include any amount and type of logic that retrieves the source values for the set of participating threads from the source vector register included in the register file 452(1).

Figure 7:
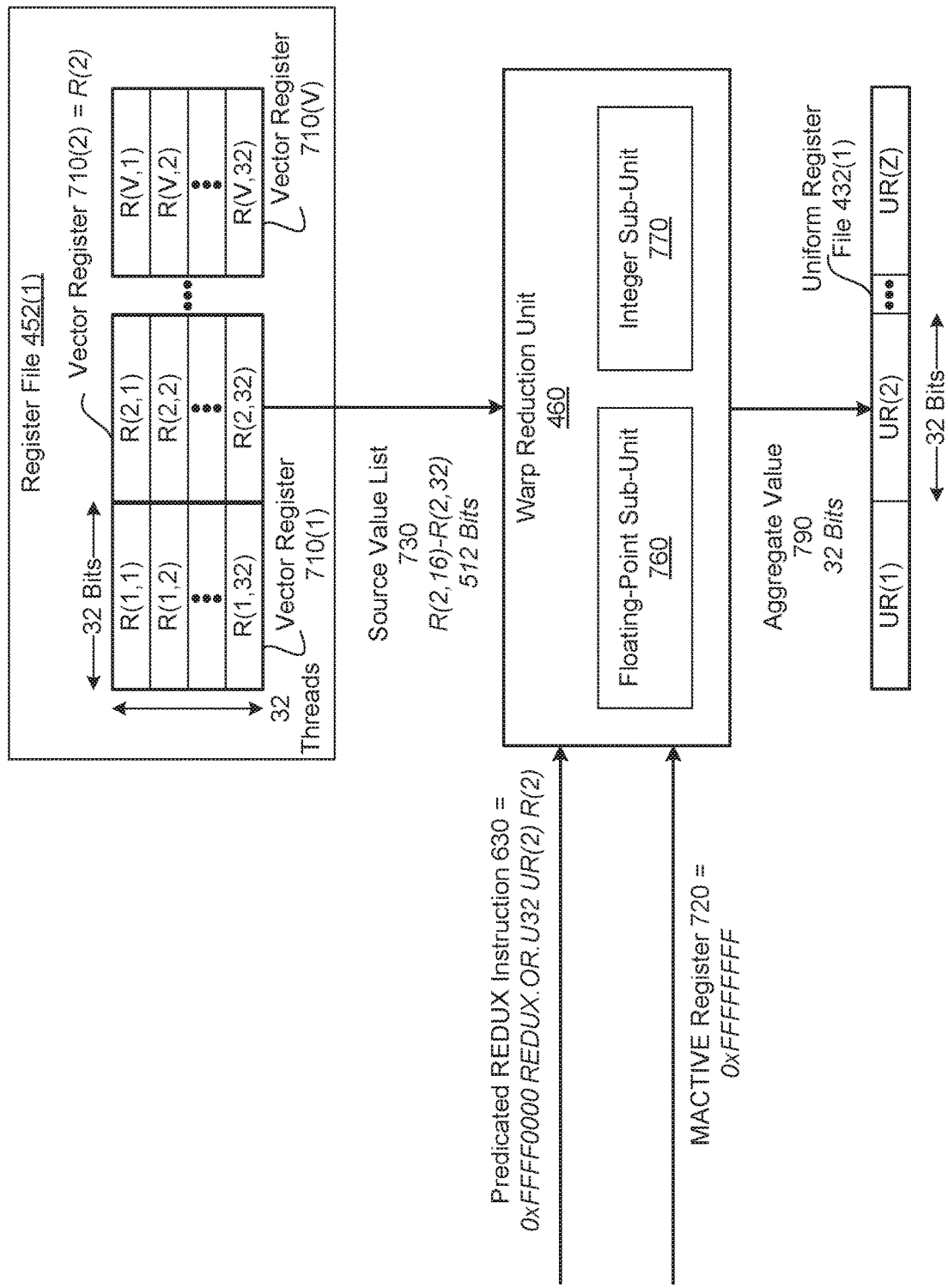
FIG. 7 is a more detailed illustration of the warp reduction unit of FIGS. 4 and 5, according to various embodiments.

As described in greater detail in conjunction with FIG. 7, the warp reduction unit 460 includes, without limitation, a floating-point sub-unit and an integer sub-unit. If the data type/size specifies a floating-point data type, then the floating-point sub-unit applies the reduction operation across the source values in the source value list to generate a single aggregate value. Otherwise, the integer sub-unit applies the reduction operation across the source values in the source value list to generate a single aggregate value. The warp reduction unit 460 stores the aggregate value in the output uniform register included in the uniform register file 432(1).

Note that the techniques described herein are illustrative rather than restrictive, and may be altered without departing from the broader spirit and scope of the disclosure. Many modifications and variations will be apparent to those of ordinary skill in the art without departing from the scope and spirit of the described embodiments and techniques. In various embodiments, any number of the techniques disclosed herein may be implemented while other techniques may be omitted in any technically feasible fashion. As a general matter, the techniques outlined herein are applicable to performing a data reduction in hardware across at least two of the threads in a warp based on a single instruction.

For instance, in alternate embodiments, the REDUX instruction may specify source memory location(s) and destination memory location(s) that are located in any number and types of memory. The warp reduction unit 460 may acquire the source values from the source memory location(s) and store the aggregate value in the destination memory location(s) in any technically feasible fashion. In some embodiments, the warp reduction unit 460 may broadcast the aggregate value to the set of participating threads. To "broadcast" the aggregate value, the warp reduction unit 460 or any other unit in the SM 310 may store the aggregate value in multiple destination registers, where each destination register is associated with a different thread in the set of participating threads. In the same or other embodiments, the warp reduction unit 460 may determine the set of participating threads in any technically feasible fashion.

Advantageously, the warp reduction unit 460 performs each warp-level data reduction using a single instruction, no temporary registers, and does not compute any wasted results. In various embodiments, the warp-level data reduction can be performed in approximately twenty-five cycles. Relative to a prior-art shuffle-based data reduction, the latency is reduced by an order of magnitude. For instance, in some embodiments, an estimated latency is twenty-five cycles. Further, relative to a prior-art shuffle-based data reduction and a prior-art inline atomic reduction, the estimated throughput is increased. In some embodiments, the throughput is one REDUX instruction for every two cycles for each SM 310. Another advantage of the disclosed techniques is that, unlike a prior-art inline atomic reduction, the warp reduction unit 460 may support a variety of data types, data sizes, and reduction operations. For these reasons, using the REDUX instruction to perform data reductions can increase the efficiency of many parallel processing algorithms.

It will be appreciated that the SM 310 shown herein is illustrative and that variations and modifications are possible. For example, the interconnections between the various components of the SM 310, the number of subpartition units 410, the number and type of registers, etc. may be modified as desired. In another example, because the warp reduction unit 460 has a fixed latency, the warp reduction unit 460 can be moved from the MIO unit 480 to the core datapath unit 450. As a general matter, moving a functional unit from the MIO unit 480 to the core datapath unit 450 improves latency and throughput, but requires more area (since the functional unit is replicated in each core datapath unit 450).

Figure 5:
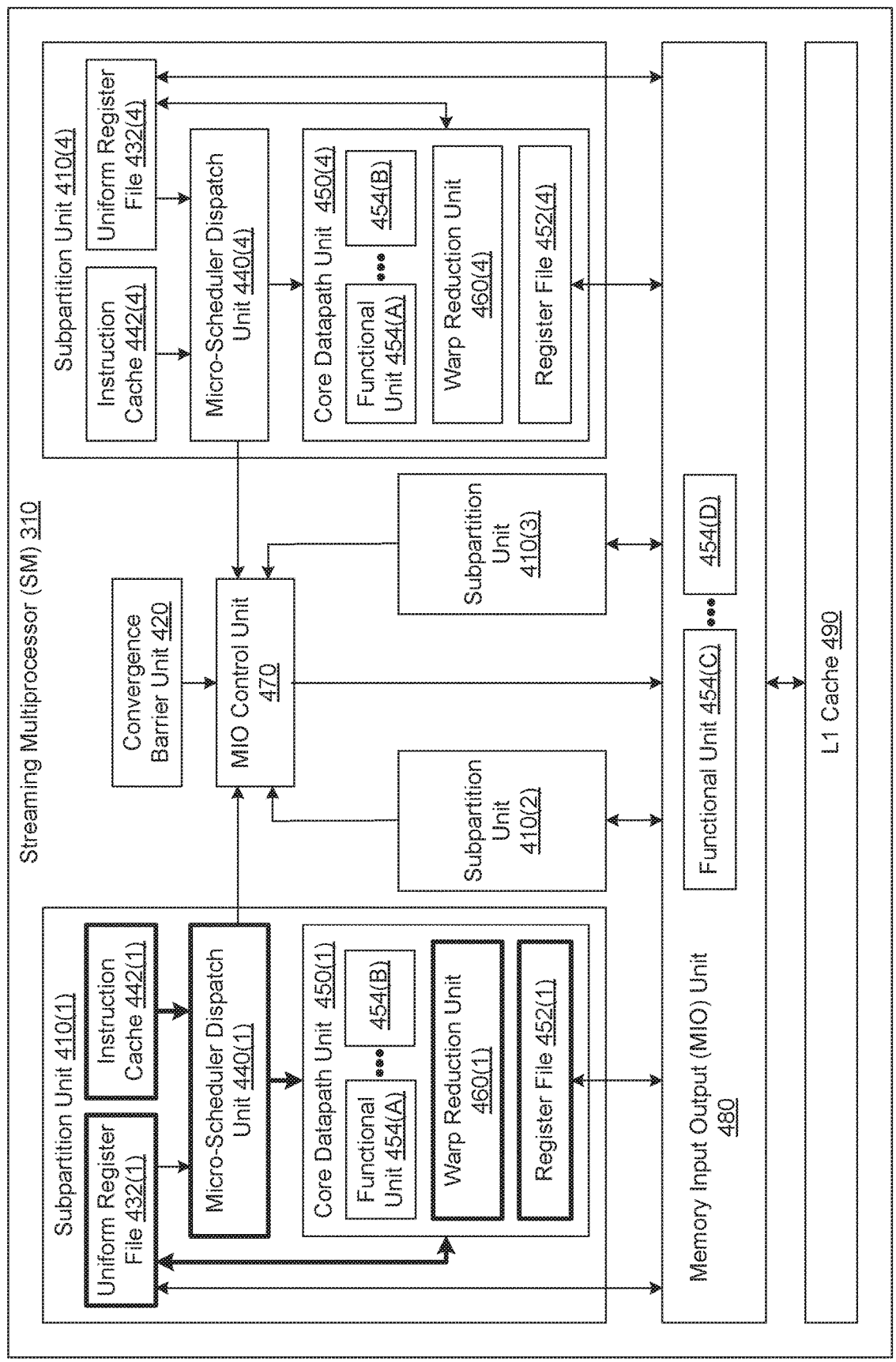
FIG. 5 is a block diagram of a streaming multiprocessor included in the general processing cluster of FIG. 3, according to other various embodiments.

FIG. 5 is a block diagram of a streaming multiprocessor 310 included in the general processing cluster of FIG. 3, according to other various embodiments. The functionality of the SM 310, the subpartition units 410(1)-410(4), the MIO control unit 470, the MIO unit 480, the L1 cache 490, the CBU 420, and the warp reduction unit 460 are described in conjunction with FIG. 4. However, the warp reduction unit 460 is included in the core datapath unit 450 instead of the MIO unit 480.

As shown, the warp reduction units 460(1)-460(4) are included in, respectively, the core datapath units 450(1)-450(4). Consequently, the SM 310 includes four instances of the warp reduction unit 460. The warp reduction unit 460($x$) executes the REDUX instruction for warps that are assigned to the subpartition 410($x$). In alternate embodiments, the SM 310 may include S subpartition units 310, C core datapath units 450, and W warp reduction units 460, where S, C, and W are any positive integers.

For explanatory purposes only, units included in the SM 310 that are involved in an exemplary REDUX instruction for a warp assigned to the subpartition 410(1) are depicted in bold. The subpartition unit 410(1) stores the REDUX instruction in the instruction cache 442(1). Subsequently, the micro-scheduler dispatch unit 440(1) reads the REDUX instruction from the instruction cache 442(1) and attaches the associated guard predicate to generate a predicated REDUX instruction (not shown in FIG. 5) Because the warp reduction unit 460(1) is included in the core datapath unit 450(1), the micro-scheduler dispatch unit 440(1) schedules and issues the predicated REDUX instruction to the warp reduction unit 460(1). The warp reduction unit 460(1) executes the predicated REDUX instruction as described previously in conjunction with FIG. 4.

Relative to embodiments in which the warp reduction unit 460 is included in the MIO unit 480, the estimated latency is reduced by at least a half and the estimated throughput is increased by a factor of four. In various embodiments, the warp-level data reduction can be performed in approximately twelve cycles and the estimated throughput is four REDUX instructions for every two cycles for each SM 310. In alternate embodiments, each of N subpartition units 410 includes an instance of the warp reduction unit 460, and the estimated throughput is increased by a factor of N relative to embodiments in which the warp reduction unit 460 is included in the MIO unit 480.

Reduction (REDUX) Instruction

Figure 6:
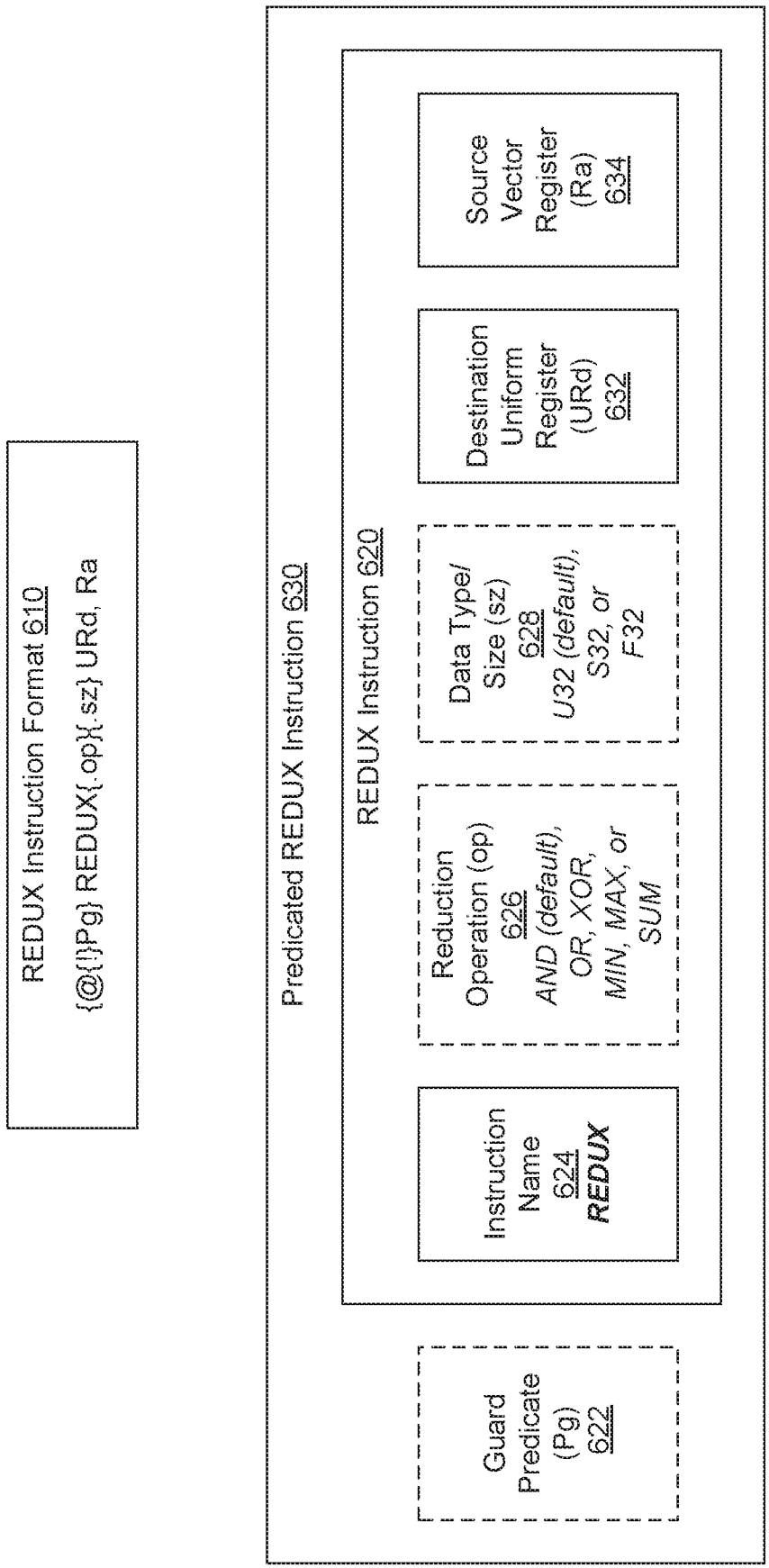
FIG. 6 is a conceptual illustration of a reduction ("REDUX") instruction that configures the warp reduction units of FIGS. 4 and 5 to apply a reduction operation across values associated with different threads included in a warp, according to various embodiments.

FIG. 6 is a conceptual illustration of a reduction (REDUX) instruction 620 that configures the warp reduction unit 460 of FIGS. 4 and 5 to apply a reduction operation across values associated with different threads included in a warp. As shown, a REDUX instruction format 610 is "{@{!}Pg} REDUX{.op}{.sz} URd, Ra," where a guard predicate ("@{!}Pg") 622 optionally precedes the REDUX instruction 620. The REDUX instruction 620 includes, without limitation, an instruction name 624 of "REDUX," a reduction operation ("op") 626, a data type/size ("sz") 628, a destination uniform register ("URd") 632, and a source vector register ("Ra") 634. A predicated REDUX instruction 630 includes, without limitation, the guard predicate 622 and the REDUX instruction 620. Optional portions of the REDUX instruction 620 and the predicated REDUX instruction 630 are depicted in dashed boxes.

Note that, for explanatory purposes only, the warp reduction unit 460 is described herein as if the REDUX instruction 620 is also an internal dispatch command. However, as persons skilled in the art will recognize, in various embodiments, an internal dispatch command may be derived from the REDUX instruction 620 or the predicated REDUX instruction 630 in any technically feasible fashion. Further, the internal dispatch command may configure the warp reduction unit 460 to implement reduction operations as described herein across a set of participating threads in any technically feasible fashion.

The guard predicate 622 is written as "@Pg" or optionally negated and written as "@!Pg," where Pg specifies a one-bit predicate register (also referred to herein as a "thread register"). If the guard predicate 622 is written at "@Pg," then the guard predicate 622 is the value stored in the predicate register Pg. If, however, the guard predicate 622 is written as "@!Pg," then the guard predicate 622 is the negation of the value stored in predicate register Pg. For a given thread, if the guard predicate 622 is not explicitly specified, then the thread operates as if the guard predicate 622 were 1.

For each thread in the warp for which the REDUX instruction 620 is issued, if the associated guard predicate 622 is 1 (or is omitted) and the thread is active, then the thread participates in the execution of the REDUX instruction 620. Otherwise, the thread does not participate in the execution of the REDUX instruction 620. A thread is active if the associated bit included in a hidden machine register referred to herein as an "MACTIVE register" (not shown in FIG. 7) is true. Otherwise, the thread is inactive. Accordingly, the MACTIVE register names the set of active threads. The MACTIVE register is one of several hidden machine registers included in the CBU 420. In alternate embodiments, the the guard predicate 622 and the set of active threads may be specified in any technically feasible fashion. In the same or other embodiments, the set of participating threads (i.e., the set of threads that participate in the execution of the reduction instruction 620) may be determined in any technically feasible fashion.

If a given thread participates in the reduction instruction 620, then the source value associated with the thread that is stored in the source vector register 634 is included in the source value list (not shown in FIG. 6) and participates in the data reduction. Otherwise, the source value associated with the thread that is stored in the source vector register 632 is excluded from the source value list and does not participate in the data reduction.

The reduction operation 626 specifies the operation that the warp reduction unit 460 applies across the source values in the source value list to compute an aggregate value (not shown in FIG. 6). For example, if the input list includes six source values a, b, c, d, e, and f, then the aggregate value produced by the warp reduction unit 460 is "a op b op c op d op e op f." Note that the reduction operation 626 is both associative and commutative and reduces a set of values to a single value.

As shown, the supported values for the reduction operation 626 are bitwise AND ("AND"), bitwise OR ("OR"), bitwise XOR ("XOR"), arithmetic minimum ("MIN"), arithmetic maximum ("MAX"), and arithmetic summation ("SUM"). Note that the warp reduction unit 360 truncates the arithmetic summation based on the data type/size 628 (e.g., to 32 bits for the data type/size 628 of 32-bit unsigned integer). If a given REDUX instruction 620 does not specify the reduction operation 626, then the reduction operation 626 defaults to bitwise AND. In alternate embodiments, the warp reduction unit 460 and the REDUX instruction 620 may support any number of reduction operations 626 and the reduction operation 626 may default to any one of the supported reduction operations 626.

The data type/size 628 specifies a data type and a data size for each of the source values in the source value list of the REDUX instruction 620. As shown, the supported values for the data type/size 628 are 32-bit unsigned integer ("U32"), 32-bit signed integer ("S32"), and 32-bit floating-point ("F32."). If a given REDUX instruction 620 does not specify the data type/size 628, then the data type/size 628 defaults to 32-bit unsigned integer. In alternate embodiments, the warp reduction unit 460 and the REDUX instruction 620 may support any number of data types/sizes 628 and the data type/size 628 may default to any one of the supported data types/sizes 628.

The destination uniform register 632 specifies the uniform register to which the warp reduction unit 460 stores the aggregate value resulting from the data reduction. In alternate embodiments, the destination uniform register 632 may be replaced with any type of memory location (e.g., a register). In some embodiments, the destination uniform register 632 may be replaced with any number and type of destination memory locations to which the warp reduction unit 460 broadcasts the aggregate value resulting from the data reduction.

The source vector register 634 specifies the vector register storing the source values on which the data reduction is performed. In alternate embodiments, the source vector register 634 may be replaced with any number and type of source memory locations that specify the source values for the data reduction in any technically feasible fashion.

Advantageously, the REDUX instruction 620 can be used to accelerate many commonly performed operations for a wide variety of workloads. For example, REDUX instructions 620 specifying the reduction operation 626 of XOR can improve the efficiency of parity computations that are used for error checking in domains such as 5G. REDUX instructions 620 for floating-point numbers can be used to reduce the time required to perform a batch normalization step in many deep learning algorithms.

FIG. 7 is a more detailed illustration of the warp reduction unit 460 of FIGS. 4 and 5, according to various embodiments. For explanatory purposes only, FIG. 7 depicts the data reduction specified via the predicated REDUX instruction 630 for a 32-thread warp that is assigned to the subpartition 410(1). FIG. 7 depicts the predicated REDUX instruction 630 as "0xFFFF0000 REDUX.OR.U32 UR(2) R(2)," where "0xFFFF0000" is the value that extracting the guard predicate 622 to a 32-bit register would produce. Further, FIG. 7 depicts the exemplary value of an MACTIVE register 720 that specifies the set of active threads as 0xFFFFFFFF, thereby specifying that all of the threads in the warp associated with the predicated REDUX instruction 630 are active.

The warp reduction unit 460 includes, without limitation, a floating-point sub-unit 760 and an integer sub-unit 770. The floating-point sub-unit 760 includes, without limitation, any amount and type of logic that is capable of executing data reductions involving the floating-point data types/sizes 628 and the floating-point reduction operations 626 that are supported by the REDUX instruction 620. For instance, in some embodiments, the floating-point sub-unit 760 includes multiple trees of ALUs and iteration logic that iterates over the trees. In various embodiments, the floating-point sub-unit 760 implements additional bits of precision during accumulations to reduce floating-point errors.

The integer sub-unit 770 includes, without limitation, any amount and type of logic that is capable of executing data reductions involving the integer data types/sizes 628 and the integer reduction operations 626 that are supported by the REDUX instruction 620. For instance, in some embodiments, the integer sub-unit 770 includes multiple trees of ALUs and iteration logic that iterates over the trees. In alternate embodiments, the warp reduction unit 460 may include one but not both of the floating-point sub-unit 760 and the integer sub-unit 770.

Upon receiving the predicated REDUX instruction 630, the warp reduction unit 460 acquires a source value list 730 based on the guard predicate 622, the MACTIVE register 720, and the source vector register 634 of R(2). The warp reduction unit 460 may acquire the source value list 730 in any technically feasible fashion. For instance, in some embodiments, the warp reduction unit 460 includes input logic that acquires the source value list 730.

As shown, R(2) is a vector register 710(2) that is one of V vector registers 710 included in the register file 452(1). Each of the vector registers 710 includes, without limitation, thirty-two 32-bit registers, where each register is associated with a different thread of a warp. Within the vector register 710(x), the individual registers are designated as R(x, y), where y specifies the associated thread. The vector register 710(2) includes the thirty-two registers R(2,1)-R(2, 32).

Because the "extracted" guard predicate 622 is "0xFFFF0000" and the MACTIVE register 720 specifies that all of the threads 1-32 in the warp are included in the set of active threads, the threads 16-32 participate in the execution of the reduction instruction 620. Accordingly, the warp reduction unit 460 acquires a source value list 730 that includes the 512 bits stored in the sixteen registers R(2,16)-R(2, 32).

The data type/size 628 is unsigned 32-bit integer and, consequently, the integer sub-unit 770 applies the reduction operation 626 of bitwise OR across the source value list 730 to generate an aggregate value 790. The size and type of the aggregate value 790 are specified by the data type/size 628. Because the data type/size 628 is unsigned 32-bit integer, the aggregate value 790 includes 32 bits. The warp reduction unit 460 stores the aggregate value 790 in the destination uniform register 632. The warp reduction unit 460 may store the aggregate value 790 in the destination uniform register 632 in any technically feasible fashion. For instance, in some embodiments, the warp reduction unit 460 includes output logic that stores the aggregate value 790 in the destination uniform register 632. As shown, the destination uniform register 632 is one of any number of uniform registers ("UR") included in the uniform register file 432(1).

In alternate embodiments, the REDUX instruction 620 may specify any number and type of source memory locations instead of the source vector register 634 and/or any number and types of destination memory locations instead of the destination uniform register 632. If more than one destination memory location is specified, then the warp reduction unit 460 broadcasts the aggregate value 790 to each of the destination memory locations.

Figure 8:
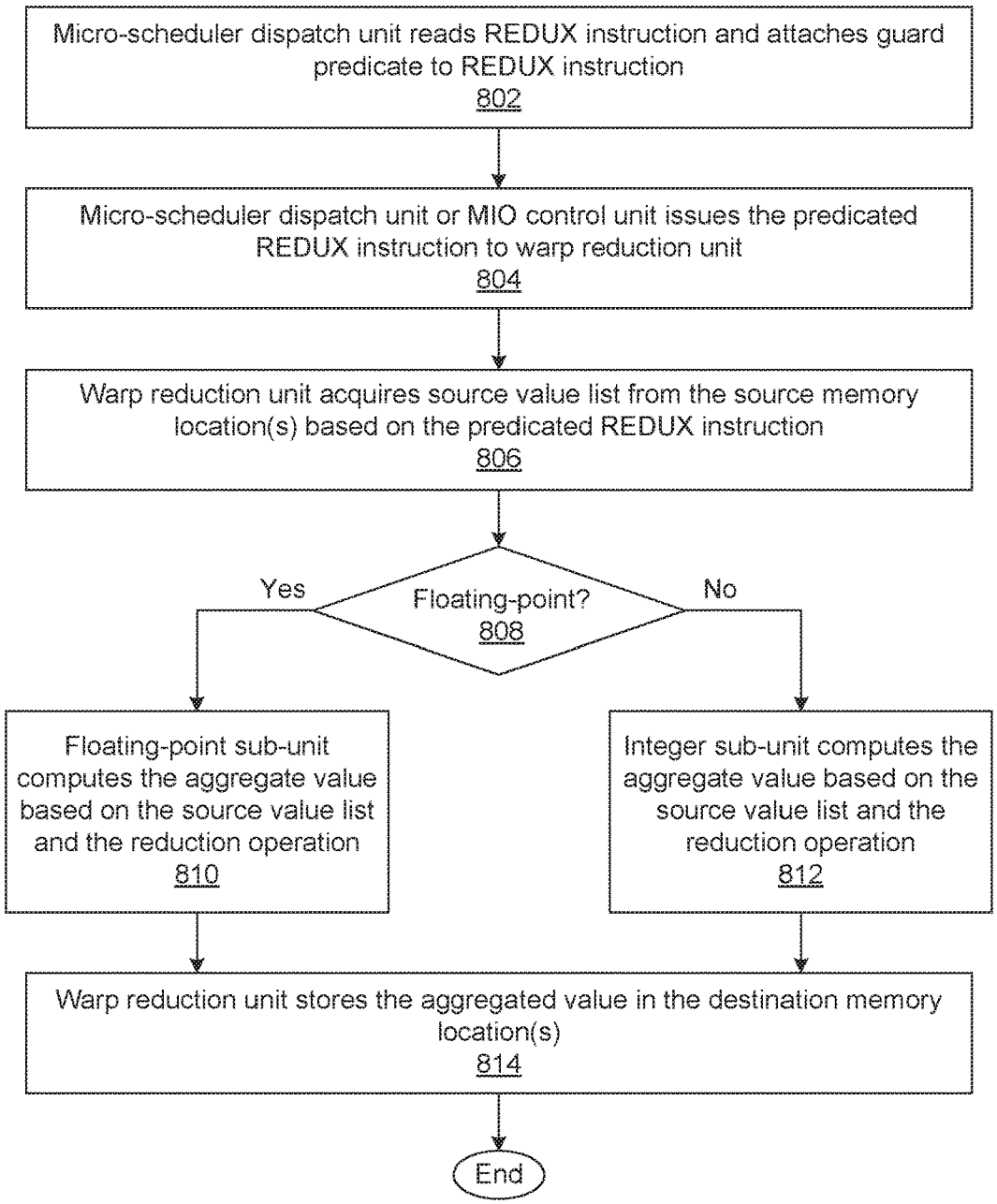
FIG. 8 is a flow diagram of method steps for applying a reduction operation across values associated with different threads included in a warp, according to various embodiments.

FIG. 8 is a flow diagram of method steps for applying a reduction operation across values associated with different threads included in a warp, according to various embodiments. Although the method steps are described with reference to the systems of FIGS. 1-8, persons skilled in the art will understand that any system configured to implement the method steps, in any order, falls within the scope of the present disclosure.

As shown, a method 800 begins at step 802, where the micro-scheduler dispatch unit 440(x) reads the REDUX instruction 620 from the instruction cache 442(x) and attaches the guard predicate 622 to the REDUX instruction 620 to generate the predicated REDUX instruction 630. At step 804, the micro-scheduler dispatch unit 440(x) or the MIO controller 470 issues the predicated REDUX instruction 630 to the warp reduction unit 460.

At step 806, the warp reduction unit 460 acquires the source value list 730 from the source memory location(s) based on the predicated REDUX instruction 630 and the MACTIVE register 720. At step 808, the warp reduction unit 460 determines whether the data type/size 628 specifies a floating-point data type. If, at step 808, the warp reduction unit 460 determines that the data type/size 628 specifies a floating-point data type, then the method 800 proceeds to step 810. At step 810, the floating-point sub-unit 760 computes the aggregate value 790 based on the source value list 730 and the reduction operation 626. The method 800 then proceeds directly to step 814. At step 814, the warp reduction unit 460 stores the aggregate value 790 in the destination memory location(s), and the method 800 terminates.

If, however, at step 808, the warp reduction unit 460 determines that the data type/size 628 does not specify a floating-point data type, then the method 800 proceeds directly to step 812. At step 812, the integer sub-unit 770 computes the aggregate value 790 based on the source value list 730 and the reduction operation 626. At step 814, the warp reduction unit 460 stores the aggregate value 790 in the destination memory location(s), and the method 800 terminates.

In sum, a reduction (REDUX) instruction configures a warp reduction unit to apply a reduction operation across the values in a source vector register that are associated with a set of participating threads and store the resulting aggregate value in a destination uniform register. The reduction operation, a data size/type, the source vector register, and the destination uniform register are specified in the REDUX instruction. The set of participating threads is defined based on a guard predicate that is associated with the REDUX instruction and an MACTIVE register that defines the set of active threads of a warp. In some embodiments, a compiler ensures that the set of participating threads are active and converged prior to the execution of the REDUX instruction. For example, the compiler could insert a WARPSYNC instruction specifying the set of participating threads immediately prior to the REDUX instruction. The WARPSYNC instruction would cause each thread in the set of participating threads to block until all of the threads in the set of participating threads were at the WARPSYNC instruction.

In one embodiment, the warps assigned to an SM are distributed between multiple subpartition units that each includes, without limitation, an instruction cache, a warp reduction unit, a register file, a uniform register file, and a micro-scheduler dispatch unit. Each warp reduction unit can access the registers and uniform registers for the associated warps and cannot access the registers and uniform registers for other warps. When one of the micro-scheduler dispatch units reads a REDUX instruction from the associated instruction cache, the micro-scheduler dispatch unit attaches the guard predicate to the REDUX instruction and then issues the resulting predicated REDUX instruction to the associated warp reduction unit.

In another embodiment, the multiple warp reduction units included in the subpartition units are replaced with a single warp reduction unit included in a memory input/output (MIO) unit. The warp reduction unit can access the registers and uniform registers for all the warps assigned to the SM. When one of the micro-scheduler dispatch units reads a REDUX instruction from the associated instruction cache, the micro-scheduler dispatch unit attaches the associated guard predicate to the REDUX instruction and then forwards the resulting predicated REDUX instruction to a MIO control unit. The MIO control unit receives the predicated REDUX instruction and issues the predicated REDUX instructions to the warp reduction unit.

When the warp reduction unit receives the predicated REDUX instruction, the warp reduction unit acquires a source value list. The source value list includes the source values stored in the source vector register that are associated with the set of participating threads. The warp reduction unit applies a reduction operation across the source values in the source value list to generate an aggregate value. The warp reduction unit may include any amount and type of logic (e.g., tree(s) of ALUs, iteration logic, etc.) that is capable of executing data reductions for the supported data sizes, data types, and reduction operations. The warp reduction unit then stores the aggregate value in the destination uniform register specified by the predicated REDUX instruction.

At least one technical advantage of the disclosed techniques relative to the prior art is that the warp reduction unit can reduce the latency of warp-level data reductions by an order of magnitude relative to prior art shuffle-based techniques. In particular, the warp reduction unit performs each warp-level data reduction in response to a single REDUX instruction, does not use temporary registers, and does not generate superfluous output values. Additionally, the warp reduction unit can perform data reductions involving a variety of different reduction operations, data types, and data sizes. For these reasons, using the REDUX instruction to perform data reductions can increase the efficiency of many parallel processing algorithms. These technical advantages represent one or more technological advancements over prior art approaches.

1. In some embodiments, a computer-implemented method comprises, in response to a single instruction associated with a plurality of threads executing in a multi-threaded processor, accessing a plurality of register values stored in a plurality of source registers, wherein each source register in the plurality of source registers is associated with a different thread included in the plurality of threads; executing one or more operations on the plurality of register values to generate an aggregate value; and storing the aggregate value in a first destination register that is accessible to at least one thread included in the plurality of threads.

2. The method of clause 1, wherein the first destination register comprises a uniform register that is accessible to each thread included in the plurality of threads.

3. The method of clauses 1 or 2, wherein the first destination register is associated with a first thread included in the plurality of threads, and further comprising storing the aggregate value in a second destination register that is associated with a second thread included in the plurality of threads.

4. The method of any of clauses 1-3, wherein the plurality of threads are included in a thread group that concurrently executes the same program, and further comprising determining that the single instruction applies to the plurality of threads based on a guard predicate associated with the single instruction.

5. The method of any of clauses 1-4, wherein executing the one or more operations on the plurality of register values comprises applying a reduction operation specified in the single instruction to the plurality of register values.

6. The method of any of clauses 1-5, wherein the reduction operation comprises one of a bitwise AND operation, a bitwise OR operation, a bitwise XOR operation, an arithmetic minimum operation, an arithmetic maximum operation, and an arithmetic summation operation.

7. The method of any of clauses 1-6, wherein each register value included in the plurality of register values comprises a floating-point number, an unsigned integer number, or a signed integer number.

8. The method of any of clauses 1-7, wherein the plurality of source registers comprises a vector register.

9. The method of any of clauses 1-8, wherein a first data size of the aggregate value matches a second data size of each of the register values included in the plurality of register values.

10. In some embodiments, a warp reduction unit comprises input logic that, in response to receiving a first instruction associated with a plurality of threads, accesses a plurality of register values stored in a plurality of source registers, wherein each source register in the plurality of source registers is associated with a different thread included in the plurality of threads; a first reduction sub-unit coupled to the input logic that executes one or more operations on the plurality of register values to generate an aggregate value; and output logic coupled to the first reduction sub-unit that stores the aggregate value in a first destination register for access by at least one thread included in the plurality of threads.

11. The warp reduction unit of clause 10, wherein the aggregate value comprises an integer number and further comprising a second reduction sub-unit coupled to the input logic and the output logic that executes one or more operations on a plurality of floating-point numbers accessed by the input logic in response to a second instruction to generate an aggregate floating-point number that the output logic stores in a second destination register.

12. The warp reduction unit of clauses 10 or 11, wherein the first destination register comprises a uniform register that is accessible to each thread included in the plurality of threads.

13. The warp reduction unit of any of clauses 10-12, wherein the plurality of threads are included in a thread group that concurrently executes the same program, and wherein the input logic determines that the first instruction applies to the plurality of threads based on a guard predicate associated with the first instruction.

14. The warp reduction unit of any of clauses 10-13, wherein executing the one or more operations on the plurality of register values comprises applying a reduction operation specified in the first instruction to the plurality of register values.

15. The warp reduction unit of any of clauses 10-14, wherein the plurality of source registers comprises a vector register.

16. In some embodiments, an apparatus comprises an instruction scheduler that issues, for execution, a first instruction associated with a plurality of threads; a plurality of source registers, wherein each source register in the plurality of source registers stores a register value associated with a different thread included in the plurality of threads; a destination register that is accessible to at least one thread included in the plurality of threads; and a warp reduction unit coupled to the instruction scheduler that receives the first instruction from the instruction scheduler, in response to receiving the first instruction, accesses a plurality of register values stored in the plurality of source registers, executes one or more operations on the plurality of register values to generate an aggregate value, and stores the aggregate value in the destination register for access by the at least one thread included in the plurality of threads.

17. The apparatus of clause 16, wherein the destination register comprises a uniform register that is accessible to each thread included in the plurality of threads.

18. The apparatus of clauses 16 or 17, wherein the plurality of threads are included in a thread group that concurrently executes the same program, and wherein the warp reduction unit determines that the first instruction applies to the plurality of threads based on a guard predicate associated with the first instruction.

19. The apparatus of any of clauses 16-18, wherein executing the one or more operations on the plurality of register values comprises applying a reduction operation specified in the first instruction to the plurality of register values.

20. The apparatus of any of clauses 16-19 wherein a first source register included in the plurality of source registers is accessible to a first thread included in the plurality of threads and is not accessible to a second thread included in the plurality of threads.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, the method comprising:
    receiving a single reduction operation instruction associated with a plurality of threads executing in a multithreaded processor;
    in response to receiving the single reduction operation instruction, accessing a plurality of register values stored in a plurality of source registers in memory, wherein each source register in the plurality of source registers is associated with a different thread included in the plurality of threads;
    executing a reduction operation specified in the single reduction operation instruction on the plurality of register values to generate an aggregate value associated with the plurality of register values; and
    storing the aggregate value in a first destination register in the memory that is accessible to at least one thread included in the plurality of threads.

2. The method of claim 1, wherein the first destination register comprises a uniform register that is accessible to each thread included in the plurality of threads.

3. The method of claim 1, wherein the first destination register is associated with a first thread included in the plurality of threads, and further comprising storing the aggregate value in a second destination register in the memory that is associated with a second thread included in the plurality of threads.

4. The method of claim 1, wherein the plurality of threads is included in a thread group that concurrently executes the same program, and further comprising:
    determining, based on a guard predicate associated with the single reduction operation instruction, that the single reduction operation instruction applies to the plurality of threads.

5. The method of claim 1, wherein the single reduction operation instruction comprises one of a bitwise AND operation, a bitwise OR operation, a bitwise XOR operation, an arithmetic minimum operation, an arithmetic maximum operation, or an arithmetic summation operation.

6. The method of claim 1, wherein each register value included in the plurality of register values comprises a floating-point number, an unsigned integer number, or a signed integer number.

7. The method of claim 1, wherein the plurality of source registers comprises a vector register.

8. The method of claim 1, wherein a first data size of the aggregate value matches a second data size of each of the register values included in the plurality of register values.

9. A warp reduction unit included in a multithreaded processor, comprising:
    input logic that, in response to receiving a first reduction operation instruction associated with a plurality of threads executing in the multithreaded processor, accesses a plurality of register values stored in a plurality of source registers in memory, wherein each source register in the plurality of source registers is associated with a different thread included in the plurality of threads;
    a first reduction sub-unit coupled to the input logic that executes a reduction operation specified in the first reduction operation instruction on the plurality of register values to generate an aggregate value associated with the plurality of register values; and output logic coupled to the first reduction sub-unit that stores the aggregate value in a first destination register in the memory for access by at least one thread included in the plurality of threads.

10. The warp reduction unit of claim 9, wherein the aggregate value comprises an integer number and further comprising:
a second reduction sub-unit coupled to the input logic and the output logic that executes one or more operations on a plurality of floating-point numbers accessed by the input logic in response to a second instruction to generate an aggregate floating-point number that the output logic stores in a second destination register in the memory.

11. The warp reduction unit of claim 9, wherein the first destination register comprises a uniform register that is accessible to each thread included in the plurality of threads.

12. The warp reduction unit of claim 9, wherein:
the plurality of threads is included in a thread group that concurrently executes the same program, and
the input logic determines, based on a guard predicate associated with the first reduction operation instruction, that the first reduction operation instruction applies to the plurality of threads.

13. The warp reduction unit of claim 9, wherein the plurality of source registers comprises a vector register.

14. An apparatus, comprising:
an instruction scheduler that issues, for execution, a first reduction operation instruction associated with a plurality of threads;
a memory that stores:
a plurality of source registers, wherein each source register in the plurality of source registers stores a register value associated with a different thread included in the plurality of threads, and
a destination register that is accessible to at least one thread included in the plurality of threads; and
a warp reduction unit coupled to the instruction scheduler that:
receives the first reduction operation instruction from the instruction scheduler,
in response to receiving the first reduction operation instruction, accesses a plurality of register values stored in the plurality of source registers,
executes a reduction operation specified in the first reduction operation instruction on the plurality of register values to generate an aggregate value associated with the plurality of register values, and
stores the aggregate value in the destination register for access by the at least one thread included in the plurality of threads.

15. The apparatus of claim 14, wherein the destination register comprises a uniform register that is accessible to each thread included in the plurality of threads.

16. The apparatus of claim 14, wherein:
the plurality of threads is included in a thread group that concurrently executes the same program, and
the warp reduction unit determines, based on a guard predicate associated with the first reduction operation instruction, that the first reduction operation instruction applies to the plurality of threads.

17. The apparatus of claim 14, wherein a first source register included in the plurality of source registers is accessible to a first thread included in the plurality of threads and is not accessible to a second thread included in the plurality of threads.

* * * * *